United States Patent Office 3,226,577

Patented Dec. 28, 1965

3,226,577
PULSE SEPARATION SPACING CONTROL CIRCUIT

Yasuo Azuma and Toshiaki Emoto, Kawasaki, Japan, assignors to Fujitsu Limited, Kawasaki, Japan, a corporation of Japan Filed Dec. 24, 1964, Ser. No. 421,121
Claims priority, application Japan, Dec. 28, 1963, 38/71,081
6 Claims. (Cl. 307—88.5)

The present invention relates to a pulse separation spacing control circuit. More particularly, the invention relates to a pulse separation spacing control circuit for providing at least a minimum spacing between the consecutive pulses of a pulse train.

When digital signals or pulses are read out from a memory, the spacing or time interval between consecutive or successive pulses may vary and may be rather small. If the pulses are fed into a computer or counter or the like and if the spacing or time interval between successive pulses is too small, the computer or counter or the like will not function properly.

The principal object of the present invention is to provide a new and improved pulse separation spacing control circuit.

The pulse separation spacing control circuit of the present invention avoids the disadvantages of pulses which are bunched too closely together by providing at least a minimum spacing or time interval between the successive pulses of a pulse train. The pulse train provided by the pulse separation spacing control circuit of the present invention may be fed to computers and counters and the like and will not cause improper functioning of such computers or counters. The input pulse train supplied to the pulse separation spacing control circuit may be derived from any suitable source such as, for example, a memory which may comprise, for example, a magnetic memory of drum, tape or disc type.

In accordance with the present invention, the pulse separation spacing control circuit comprises a monostable multivibrator having an operating time during which it is in a stable condition and a non-operating time during which it is non-operating, the monostable multivibrator having an input for a series of spaced successive input pulses and an output. A bistable multivibrator has a first operating time during which it is in a first stable state and a second operating time during which it is in a second stable state, an input and an output. A gate has a first input connected to the output of the monostable multivibrator, a second input, and an output connected to the input of the bistable multivibrator. The gate has a conductive condition to which it is switched when there is a signal in each of its first and second inputs at the same time and in which it conducts a signal from one of its inputs to its output and a non-conductive condition to which it is switched when there is not a signal in each of its first and second inputs at the same time and in which it prevents the transfer of a signal to its output. A delay time control circuit has a first input for a first series of spaced successive input pulses, a second input connected to the output of the bistable multivibrator for a second series of spaced successive input pulses, an output, and delay means for delaying a pulse of the first series of input pulses for a first time and for delaying a pulse of the second series of input pulses for a second time different from the first time. A pulse supply supplies a series of spaced successive input pulses to each of the input of the monostable multivibrator, the second input of the gate and to the first input of the delay time control circuit whereby if the spacing between successive input pulses is greater than a minimum determined by the operating time of the monostable multivibrator so that an input pulse is supplied by the pulse supply after the next preceding input pulse during the non-operating time of the monostable multivibrator the gate is switched to its non-conductive condition and prevents the transmission of a signal to the bistable multivibrator so that it is switched to its second stable state and no signal is supplied to the second input of the delay time control circuit, an input pulse from the pulse supply in the first input of the delay time control circuit being provided in the output thereof after a delay of the first time so that the input pulse is spaced a first time interval from the next preceding pulse in the series of spaced successive input pulses. If the spacing between successive input pulses is less than the minimum so that two successive input pulses are supplied by the pulse supply during the operating time of the monostable multivibrator the gate is switched to its conductive condition and transmits a signal to the bistable multivibrator so that it is switched to its first stable state and an input pulse is supplied to the second input of the delay time control circuit, the input pulse being provided in the output thereof after a delay of the second time so that the input pulse is spaced a second time interval from the next preceding pulse in the series of spaced successive input pulses.

In order that the present invention may be readily carried into effect, it will now be described with reference to the accompanying drawings, wherein:

FIGS. 1*a*, 1*b*, 1*c* and 1*d* are illustrations of input and output pulse trains of the pulse separation spacing control circuit of the present invention;

Figures 1A, 1B, 1C, 1D:
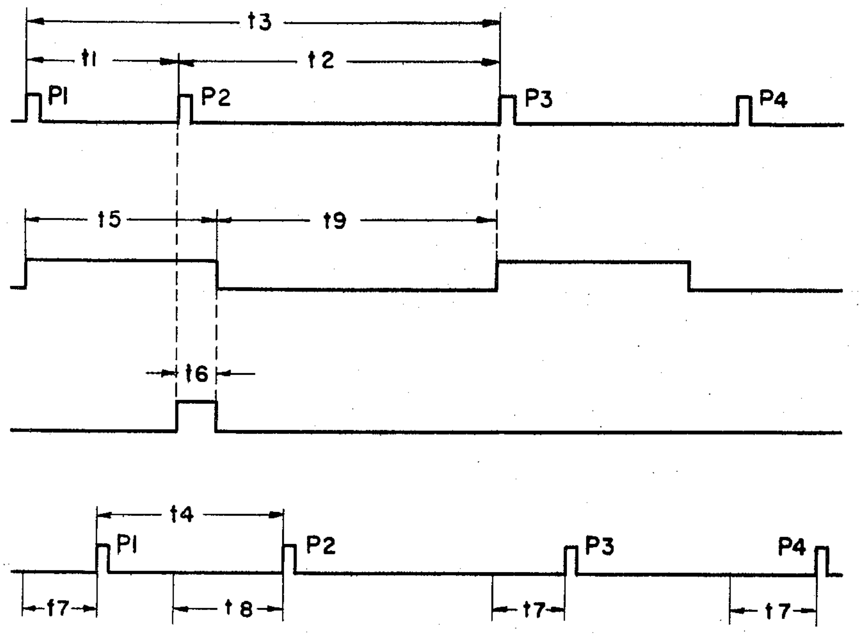
Figure 2:
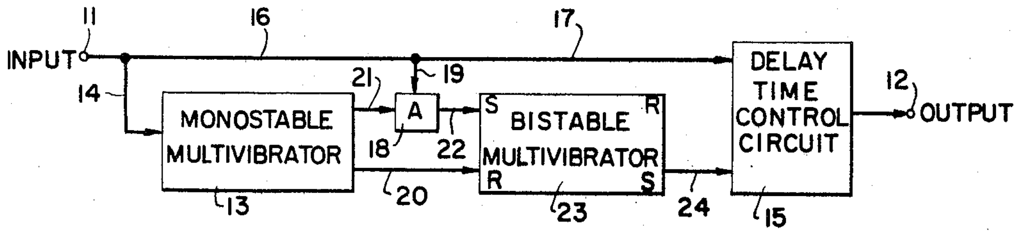
FIG. 2 is a block diagram of an embodiment of the pulse separation spacing control circuit of the present invention.

FIG. 1*a* illustrates an input pulse train which may be supplied to input terminal 11 of the pulse separation spacing control circuit of FIG. 2 from any suitable source such as, for example, a memory or storage circuit. The successive pulses P1 and P2 are spaced from each other by a time interval $t1$ and the successive pulses P2 and P3 are spaced from each other by a time interval $t2$, so that the pulse P3 is spaced from the pulse P1 by a time interval $t3$, which is equal to the sum of $t1$ and $t2$.

FIG. 1*d* illustrates an output pulse train which may be derived from output terminal 12 of the pulse separation spacing control circuit of FIG. 2, when the inuput pulse train of FIG. 1*a* is supplied to its input terminal 11. The spacing or time interval $t1$ between the pulses P1 and P2 is increased to a time interval $t4$ which is larger than $t1$ and which is smaller than $t3/2$.

The input pulse train of FIG. 1*a* is fed from the input terminal 11 of FIG. 2 to a monostable multivibrator 13 via a lead 14. The input pulse train is also fed to a delay time control circuit 15 via leads 16 and 17 and to an AND gate 18 via the lead 16 and a lead 19. The monostable multivibrator 13 may comprise any suitable monostable multivibrator known in the art and has an operating time $t5$ (FIG. 1*b*). The operating time $t5$ of the monostable multivibrator 13 is the time that it is in stable operation. The monostable multivibrator 13 is driven by the input pulses of FIG. 1*a*. The monstable multivibrator 13 has a non-operating time $t9$ (FIG. 1*b*) during which it is non-operating.

If the input pulse P2 of FIG. 1*a* is supplied to the monostable multivibrator 13 while said multivibrator is in operation, as shown in FIG. 1*b*, wherein a broken line indicating the time position of the leading edge of the pulse P2 appears in FIG. 1*b* during the operating time *t*5 of said multivibrator, the input pulse P2 is fed to the AND gate 18. Since the monostable multivibrator 13 is then in operation, it supplies an output signal to the AND gate 18 via a lead 21.

The AND gate 18 may comprise any suitable AND gate known in the art and functions to switch to its conductive condition when a signal is present at the same time in each of the leads 19 and 21 and to switch to its non-conductive condition when a signal is present in only one of the leads 19 and 21 or in neither of said leads 19 and 21. When the AND gate 18 is in its conductive condition, it conducts a signal from one of the leads 19 and 21 to a lead 22 and when it is in its non-conductive condition it prevents the conduction of a signal to the lead 22.

When the input pulse P2 is supplied to the monstable multivibrator 13 via the lead 14 while said multivibrator is operating, said input pulse P2 is also supplied to the AND gate 18 via the leads 16 and 19. Since the monostable multivibrator 13 is in operation, it supplies an output signal to the AND gate 18 via the lead 21. Since the input pulse P2 is supplied to the AND gate 18 via the lead 19 at the same time, said AND gate is switched to its conductive condition and conducts a signal via the lead 22 to the set input of a bistable multivibrator or flip flop 23.

When the monostable multivibrator 13 completes its operation, it no longer supplies a signal to the lead 21. This causes the AND gate 18 to switch to its non-conductive condition so that it no longer conducts a signal via the lead 22 to the set input of the flip flop 23. The flip flop 23 may be reset by any suitable means such as, for example, the absence of a signal in the lead 22 or the supply of a signal via a lead 20 from the monostable multivibrator 13 when said monostable multivibrator is in its non-operating condition. The bistable multivibrator or flip flop 23 may comprise any suitable bistable circuit known in the art and has an operating time *t*6 (FIG. 1*c*) in one stable state. The operating time *t*6 of the bistable multivibrator 23 in one stable state may be, for example, the time that it is in its set condition.

When the flip flop 23 is in its other stable state such as, for example, its reset condition, as shown in FIG. 1*d*, the input pulses, such as P1, P3, P4, supplied to the delay time control circuit 15 via the leads 16 and 17 are delayed for a time interval *t*7. When the flip flop 23 is in its one stable state such as, for example, its set condition, as shown in FIG. 1*d*, the input pulse, such as P2, supplied to the delay time control circuit 15 via a lead 24 is delayed for a time interval *t*8 which is greater than *t*7.

The successive pulses of the output pulse train provided at the output terminal 12 of the delay time control circuit 15, as shown in FIG. 1*d*, are always spaced from each other by at least a minimum spacing or time interval *t*4 which is greater than *t*5 and which is provided by the delay incurred by the pulses in passing through said delay time control circuit.

The delay time control circuit 15 may comprise any suitable variable delay time circuit. A suitable variable delay time circuit may comprise a circuit which is essentially a monostable multivibrator having an operating time or time of stable operation which may be varied by a D.C. voltage such as, for example, in the embodiment of FIG. 3. The delay time control circuit of FIG. 3 is essentially a monostable multivibrator, but differs from a usual type of monostable multivibrator because its time of operation or the time that it is in stable operation may be varied by a D.C. control voltage.

Figure 3:
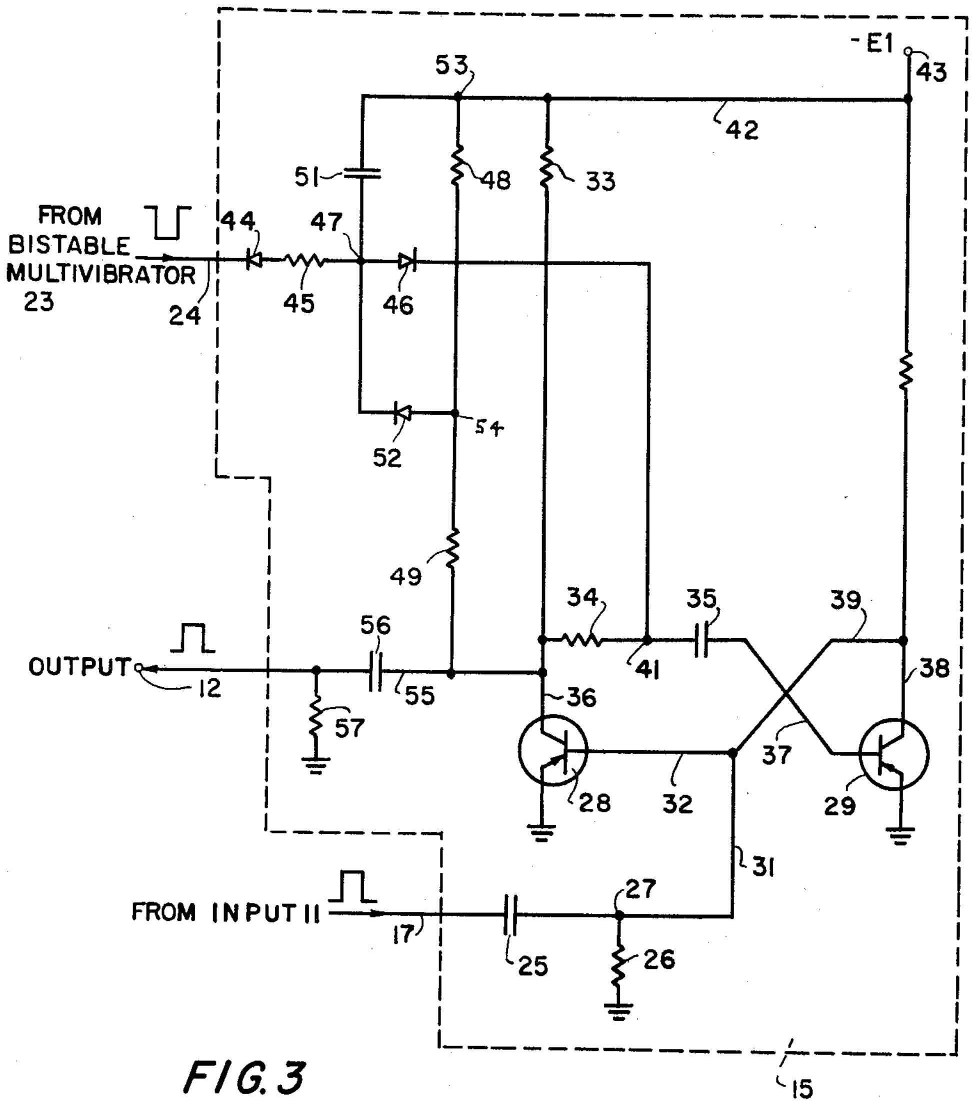
FIG. 3 is a circuit diagram of an embodiment of a time control circuit which may be utilized in the embodiment of FIG. 2.

In FIG. 3, when an input pulse is supplied to the delay time control circuit 15 via the lead 17, it passes through a differentiating circuit comprising a capacitor 25 and a resistor 26. The differentiating circuit 25, 26 differentiates the input pulse and provides the positive differentiated pulse at a point 27. The point 27 is connected to the base electrode of a first transistor 28 and to the collector electrode of a second transistor 29.

The first transistor 28 is usually in its conductive condition, but, since in the illustrated embodiment of FIG. 3 the first and second transistors 28 and 29 are PNP type transistors, when the positive pulse at the point 27 is fed to the base electrode of the first transistor 28 via leads 31 and 32, said first transistor 28 is switched to its non-conductive condition. When the first transistor 28 is in its non-conductive condition, a negative pulse is provided at its collector electrode.

When the first transistor 28 is in its non-conductive condition, the second transistor 29, which is usually in its non-conductive condition, is switched to its conductive condition by a current flowing from the emitter electrode to the base electrode of said second transistor. The second transistor 29 is maintained in its usual non-conductive condition by resistors 33 and 34 and capacitor 35; the resistor 34 and the capacitor 35 being connected in series circuit arrangement between the collector electrode of the first transistor 28 and the base electrode of the second transistor 29 via leads 36 and 37.

When the second transistor 29 is in its conductive condition, a positive pulse is provided at its collector electrode. The collector electrode of the second transistor 29 is connected to the base electrode of the first transistor 28 via leads 38 and 39. Thus, the positive pulse at the collector electrode of the second transistor 29 is applied to the base electrode of the first transistor 28 and maintains said first transistor 28 in its non-conductive condition.

Figures 4A, 4B, 4C, 4D:
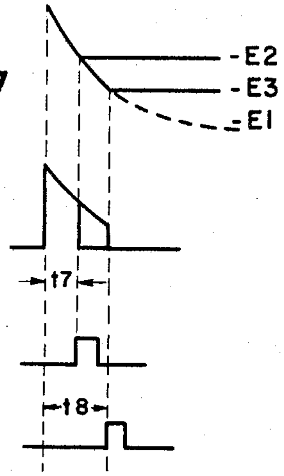
FIGS. 4*a*, 4*b*, 4*c* and 4*d* are illustrations of voltages and pulses which assist in explaining the operation of the time control circuit of FIG. 3.

At the time that the first transistor 28 is in its non-conductive condition and the second transistor 29 is in its conductive condition, the potential at a common connection point 41 between the resistor 34 and the capacitor 35 decreases toward the biasing voltage —E1, as indicated in FIG. 4*a*, at a time constant determined by the resistors 33 and 34 and the capacitor 35. The biasing voltage —E1 may be provided by any suitable source of D.C. voltage and is applied to the lead 38 and a lead 42 via terminal 43.

In FIG. 3, when an input pulse is supplied to the delay time control circuit 15 via the lead 24 from the bistable multivibrator or flip flop 23, it is applied to a diode 44. A resistor 45 is connected in series with a diode 46 and the diode 44. The diode 46 is connected directly to the point 41 at one electrode thereof and to a common connection point 47 between said diode 46 and the resistor 45 at the other electrode thereof. A pair of series connected resistors 48 and 49 are connected across the resistor 33 between the lead 42 and the collector electrode of the first transistor 28. A capacitor 51 and a diode 52 are connected in series and the series connection of said capacitor and said diode is connected across the resistor 48; the capacitor 51 being connected between the point 47 and a point 53 on the line 42 and the diode 52 being connected between said point 47 and a common connection point 54 between the resistors 48 and 49.

If the point 47 is at a potential of —E2, as shown in FIG. 4*a*, when the potential at the point 41 is —E3, the diode 46 is biased in its conducting direction and becomes conductive. The potential at the point 41 then remains at —E3 (FIG. 4*a*). When the potential at the point 41 is steady at —E3, the current at the capacitor 35 becomes zero and current flowing from the emitter electrode to the base electrode of the second transistor 29 becomes zero, as shown in FIG. 4*b*.

When the emitter-base current in the second transistor 29 becomes zero, said second transistor switches to its non-conductive condition and the potential at the collector electrode of the said transistor decreases. The potential at the collector electrode of the second transistor 29 is applied to the base electrode of the first transistor 28 via the leads 39 and 32 and said first transistor 28 is switched to its conductive condition.

The first transistor 28 is not switched from its conductive condition to its non-conductive condition when the next positive pulse is supplied to the delay time control circuit 15 via the lead 17. Thus, the time that the first transistor 28 is switched to its non-conductive condition, which is the time that the second transistor 29 is switched to its conductive condition, is determined by the time constant of the resistors 33 and 34 and the capacitor 35 and a potential of —E2 at the point 47.

During the time that the flip flop 23 (FIG. 2) is in operation or during the time that said flip flop is in one stable state such as, for example, its set condition, the lead 24 conducts a signal to the delay time control circuit 15 from said flip flop. The capacitor 51 discharges through the resistor 45 and the diode 44 and the potential at the point 47 decreases from —E2 toward —E1.

When the flip flop 23 is reset after the time *t6*, as shown in FIG. 1*c*, the potential in the lead 24 increases to a magnitude greater than —E3 so that the diode 44 is biased in its non-conducting direction and becomes non-conductive and the potential at the point 47 remains at —E2. When the potential at the point 47 changes from —E2 to —E3, the time that the first transistor 28 is in its non-conductive condition changes.

While the first transistor 28 is in its conductive condition, the potential at the point 47 is maintained at —E2, the potential —E2 being produced by the resistors 48 and 49 via the diode 52. When the flip flop 23 is in its reset condition, the diode 44 is maintained in its non-conductive condition and the potential at the point 47 is maintained at —E2. It is thus possible by the selection of appropriate capacitance and resistance values for the capacitor 51 and the resistor 45, respectively, to extend the time that the first transistor 28 is in its non-conductive condition by the time *t6* that the flip flop 23 is in its one stable state or set condition.

FIGS. 4*c* and 4*d* illustrate output pulses provided by the delay time control circuit 15 at the output terminal 12 of the pulse separation spacing control circuit of the present invention. The output pulses are provided in a lead 55 and pass through a pulse shaper comprising a capacitor 56 and a resistor 57 connected in parallel with said capacitor 56.

Any suitable circuitry may be utilized as the monostable multivibrator 13, the bistable multivibrator 23 and the AND gate 18. A suitable monostable multivibrator 13, for example, may comprise either of those described in a textbook entitled "Computer Basics, volume 3, Digital Computers—Mathematics and Circuitry," 1962, by Technical Education and Management, Inc., published by Howard W. Sams & Co., Inc., The Bobbs-Merrill Company, Inc., Indianapolis, Indiana, pages 159 to 162 and illustrated in Fig. 7–17 on page 159 and Fig. 7–18 on page 161. A suitable bistable multivibrator 23, for example, may comprise that described in the aforementioned textboook, pages 157 to 159 and illustrated in Figs. 7–16 on page 157. A suitable AND gate 18, for example, may comprise any of those described in the aforementioned textbook, pages 177 to 184 and illustrated in Figs. 8–7 and 8—8 on page 177, Figs. 8–17 on page 181 and FIGS. 8–19 on page 182.

While the invention has been described by means of a specific example and in a specific embodiment, we do not wish to be limited thereto, for obvious modifications will occur to those skilled in the art without departing from the spirit and scope of the invention.

We claim:

1. A pulse separation spacing control circuit, comprising monostable multivibrator means having an operating time during which it is in a stable condition and a non-operating time during which it is non-operating, said monostable multivibrator means having an input for a series of spaced successive input pulses and an output;

bistable multivibrator means having a first operating time during which it is in a first stable state and a second operating time during which it is in a second stable state, and bistable multivibrator means having two inputs and an output, one of said inputs being connected to said monostable multivibrator;

gate means having a first input connected to the output of said monostable multivibrator means, a second input, and an output connected to the other input of said bistable multivibrator means, said gate means having a conductive condition to which it is switched when there is a signal in each of its first and second inputs at the same time and in which it conducts a signal from one of its inputs to its output and a non-conductive condition to which it is switched when there is not a signal in each of its first and second inputs at the same time and in which it prevents the transfer of a signal to its output;

delay time control circuit means having a first input for a first series of spaced-successive input pulses, a second input connected to the output of said bistable multivibrator means for a second series of spaced successive input pulses, an output, and delay means for delaying a pulse of said first series of input pulses for a first time and for delaying a pulse of said second series of input pulses for a second time different from said first time; and pulse supply means for supplying a series of spaced successive input pulses to each of the input of said monostable multivibrator means, the second input of said gate means and to the first input of said delay time control circuit means whereby if the spacing between successive input pulses is greater than a minimum determined by the operating time of said monostable multivibrator means so that an input pulse is supplied by said pulse supply means after the next preceding input pulse during the non-operating time of said monostable multivibrator means said gate means is switched to its non-conductive condition and prevents the transmission of a signal to said bistable multivibrator means so that it is switched to its second stable state and no signal is supplied to the second input of said delay time control circuit means, an input pulse from said pulse supply means in the first input of said delay time control circuit means being provided in the output thereof after a delay of said first time so that said input pulse is spaced a first time interval from the next preceding pulse in said series of spaced successive input pulses, and if the spacing between successive input pulses is less than said minimum so that two successive input pulses are supplied by said pulse supply means during the operating time of said monostable multivibrator means said gate means is switched to its conductive condition and transmits a signal to said bistable multivibrator means so that it is switched to its first stable state and an input pulse is supplied to the second input of said delay time control circuit means, said input pulse being provided in the output thereof after a delay of said second time so that the said input pulse is spaced a second time interval from the next preceding pulse in said series of spaced successive input pulses.

2. A pulse separation spacing control circuit as claimed in claim 1, wherein said second time interval is greater than said first time interval.

3. A pulse separation spacing control circuit as claimed in claim 1, wherein said delay time control circuit means comprises first and second switching devices each selectively switchable to one of a conductive and a non-conductive condition and connecting means interconnecting said first and second switching devices for selectively switching said first and second switching devices, one of said first and second switching devices being in one of its conductive and non-conductive condition when the other of said first and second switching devices is in the other of its conductive and non-condutive condition.

4. A pulse separation spacing control circuit as claimed in claim 1, wherein said delay time control circuit means comprises first and second transistors each selectively switchable to one of a conductive and a non-conductive condition and connecting means interconnecting said first and second transistors for selectively switching said first and second transistors, one of said first and second transistors being in one of its conductive and non-conductive condition when the other of said first and second transistors is in the other of its conductive and non-conductive condition.

5. A pulse separation spacing control circuit as claimed in claim 4, wherein each of said first and second transistors has emitter, collector and base electrodes, and wherein said connecting means includes means connecting the base electrode of each of said first and second transistors to the collector electrode of the other of said first and second transistors and time constant means connected in the means connecting the base electrode of said second transistor to the collector electrode of said first transistor for determining the duration of the conductive condition of said first and second transistors.

6. A pulse separation spacing control circuit as claimed in claim 5, further comprising first coupling means and second coupling means and wherein the first input of said delay time control circuit is coupled to the means connecting the base electrode of said first transistor to the collector electrode of said second transistor via said first coupling means and wherein the second input of said delay time control circuit is coupled to said time constant means via said second coupling means.

References Cited by the Examiner

UNITED STATES PATENTS 3,112,450 11/1963 Krause ............ 328—109

ARTHUR GAUSS, *Primary Examiner.*